(12) United States Patent
Walstrom

(10) Patent No.: US 8,687,492 B2
(45) Date of Patent: Apr. 1, 2014

(54) TRAFFIC CONTROL BY IP MULTIMEDIA SUBSYSTEM

(75) Inventor: Karin Walstrom, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 146 days.

(21) Appl. No.: 13/255,274

(22) PCT Filed: Feb. 8, 2010

(86) PCT No.: PCT/EP2010/051513
§ 371 (c)(1),
(2), (4) Date: Sep. 8, 2011

(87) PCT Pub. No.: WO2010/102868
PCT Pub. Date: Sep. 16, 2010

(65) Prior Publication Data
US 2012/0002548 A1   Jan. 5, 2012

Related U.S. Application Data

(60) Provisional application No. 61/158,807, filed on Mar. 10, 2009.

(51) Int. Cl.
*H04J 1/16* (2006.01)
*H04J 3/14* (2006.01)
*H04J 3/16* (2006.01)
*H04J 3/22* (2006.01)

(52) U.S. Cl.
USPC ............................ 370/235; 370/234; 370/468

(58) Field of Classification Search
USPC .......................................... 370/229–235, 468
See application file for complete search history.

(56) References Cited

U.S. PATENT DOCUMENTS

| 7,443,824 B1 * | 10/2008 | Lipford et al. ................. 370/338 |
| 2004/0088371 A1 * | 5/2004 | Hiramatsu et al. ............ 709/217 |
| 2008/0198845 A1 | 8/2008 | Bowman |

FOREIGN PATENT DOCUMENTS

| EP | 1622304 A1 | 2/2006 |
| EP | 1760932 A1 | 3/2007 |
| KR | 2009078524 | * 6/2009 ............... H04B 7/26 |

OTHER PUBLICATIONS

Alfano, F.M., et al., "IMS Service-Based Bearer Control", Bell Labs Technical Journal, Wiley, CA, US, LNKD-DOI:10.1002/BLTJ, 20131, vol. 4, No. 10, Jan. 1, 2006, pp. 151-166, XP001239293.
"Universal Mobile Telecommunications System (UMTS); Overall high level functionality and architecture impacts of flow based charging; Stage 2 (3GPP TS 23.125 version 6.8.0 Release 6), ETSI TS 123 125", 3rd Generation Partnership Project (3GPP); Technical Specification (TS), vol. 23.125, No. V6.8.0, Mar. 1, 2006, pp. 1-49, XP002463249.

(Continued)

*Primary Examiner* — Ronald Abelson
(74) *Attorney, Agent, or Firm* — Rothwell, Figg, Ernst & Manbeck, P.C.

(57) ABSTRACT

Apparatus configured to implement a Proxy Call Session Control Function for use within an IP Multimedia Subsystem core network. The apparatus comprises a receiver for receiving a session initiation request in respect of an IP Multimedia Subsystem service, and a threshold determiner for determining a threshold applicable to user traffic associated with said service. The apparatus further comprises a sender for sending a session authorization request to a policy decision function, the request including said threshold and a service data flow identifier identifying the user plane flow for said session.

25 Claims, 5 Drawing Sheets

(56) References Cited

OTHER PUBLICATIONS

"Digital cellular telecommunications system (Phase 2+); Universal Mobile Telecommunications System (UMTS); LTE; Policy and charging control architecture (3GPP TS 23.203 version 8.4.0 Release 8); ETSI TS 123 203" ETSI Standard, Sophia Antipolis Cedex, France, vol. 3-SA2, No. V8.4.0, Jan. 1, 2009, pp. 1-113, XP014043013.

* cited by examiner

TRAFFIC CONTROL BY IP MULTIMEDIA SUBSYSTEM

CROSS-REFERENCE TO RELATED APPLICATIONS

This application is a 35 U.S.C. §371 National Phase Entry Application from PCT/EP2010/051513, filed Feb. 8, 2010, and designating the United States, and which claims priority to U.S. Provisional Application No. 61/158,807, filed Mar. 10, 2009, the disclosures of which are incorporated by reference herein in their entirety.

TECHNICAL FIELD

The present invention relates to the control of traffic by the IP Multimedia Subsystem and in particular, though not necessarily, to the control of traffic to enforce charging plans.

BACKGROUND

The IP Multimedia Subsystem (IMS) is the technology defined by the Third Generation Partnership Project (3GPP) to provide IP multimedia services over mobile communication networks. IP multimedia services can provide a dynamic combination of voice, video, messaging, data, etc. within the same session. The IMS makes use of the Session Initiation Protocol (SIP) to set up and control calls or sessions between user terminals. The Session Description Protocol (SDP), carried by SIP signals, is used to describe and negotiate the media components of the session. Whilst SIP was created as a user-to-user protocol, the IMS allows operators and service providers to control user access to services and to charge users accordingly.

FIG. 1 illustrates schematically how the IMS fits into the mobile network architecture in the case of a General Packet Radio Service (GPRS) access network. As shown in FIG. 1, control of communications occurs at three layers (or planes). The lowest layer is the Connectivity Layer 1, also referred to as the bearer or user plane, and through which signals are directed to/from user equipment (UE) accessing the network. The entities within the connectivity layer 1 that connect an IMS subscriber to IMS services form a network that is referred to as the IP-Connectivity Access Network, IP-CAN. The GPRS network includes various GPRS Support Nodes (GSNs). A Gateway GPRS Support Node (GGSN) 2a acts as an interface between the GPRS backbone network and other networks (radio network and the IMS network). The middle layer is the Control Layer 4, and at the top is the Application Layer 6.

The IMS 3 includes a core network 3a which operates over the Control Layer 4 and the Connectivity Layer 1, and a service network 3b. The IMS core network 3a includes nodes that send/receive signals to/from the GPRS network via the GGSN 2a at the Connectivity Layer 1, as well as network nodes (including Call/Session Control Functions (CSCFs) 5) which operate as SIP proxies within the IMS in the Control Layer 4.

The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF. The top, Application Layer 6 includes the IMS service network 3b. Application Servers (ASs) 7 are provided for implementing IMS service functionality.

Modern telecommunication systems may incorporate a Policy and Charging Control (PCC) architecture. A PCC architecture for the IMS is described in 3GPP TS 23.203 V7.9.0 (and later versions) in respect of packet flows in an IP-CAN session established by a user equipment UE through a 3G telecommunications system. The particular architecture comprises: a Policy and Charging Rules Function (PCRF) and a Policy and Charging Enforcement Function (PCEF). The PCRF behaves as a Policy Decision Point (PDP) or Policy Server (PS), and the PCEF behaves as a Policy Enforcing Point (PEP). Whilst the PCRF can be implemented as a standalone node, the PCEF is preferably co-located within an Access Gateway (AG) such as the GGSN in a GPRS core network. Such an architecture is illustrated schematically in FIG. 2, where BSS represents the Base Station Subsystem of a radio access network (e.g. GERAN or UTRAN). In a CDMA network, the AG may be a Packet Data Serving Node (PDSN). Related architectures are provided for 3GPP2 networks and TISPAN Next Generation Networks.

In the case of a PCEF co-located with a GGSN, the GGSN is responsible for inspecting data packets associated with data flows originating at and/or terminating in a user terminal served by the GGSN. In the case of a subscriber roaming into a "visited" network, the GGSN assigned to route data packets related to the (roaming) terminal may be located in the subscriber's home network.

When a User Equipment (UE) initiates a data session, an IP address is assigned to it by an appropriate AG. The AG provides this IP address, together with, for example, an NAI, IMSI, or MSISDN, to the Policy Server which in turn downloads into the AG one or more policy rules to be applied to the data session. When the UE communicates with an Application Function (AF), the AF may provide session details to the Policy Server. When the UE subsequently requests connectivity for the service provided by the AF, the AG informs the PS, which downloads into the AG policy rules for the connection(s) required. A policy rule may include a Service Data Flow (SDF) which consists of a standard IP 5-tuple (source IP address and port number, destination IP address and port number, protocol). Such a rule identifies a particular packet flow to the AG.

The interface between the AF and the PCRF is the Rx interface, specified in 3GPP TS 29.214. The interface between the PCRF and the PCEF is the Gx interface, specified in 3GPP TS 29.212.

In a 3GPP network, the AF may be a Proxy Call Session Control Function, P-CSCF, or another kind of application server to which the UE establishes an application communication via bearer(s) set up via IP-CAN session(s) through the AG.

Charging for IMS services utilises charging data generated using SIP signalling and SDP content received by the IMS node/s during the session negotiation. This approach enables value-based charging models rather than cost-based charging models to be employed, i.e. charging is based upon the value of a service to a user rather than directly on the cost to the operator to provide that service. However, for pure peer-to-peer services for which no application server or media proxy are present in the user plane, the service-based charging model has a weakness that might expose the network operators to fraud. This weakness arises because the IMS core, e.g. the P-CSCF, has no knowledge of the user plane traffic. Consider for example the case where a user signals to the IMS core that it wishes to share a picture with a peer user. The core anticipates that such a picture will have a (relatively small)

limited size corresponding to a typical picture, and in turn signals to the user plane that the user should be allowed to exchange the picture. However, the user then sends an entire movie consisting of many GBytes to the peer user across the user plane. This may be allowed by the AG (e.g. GGSN) as, at the user plane level, the user has a subscription that allows unlimited data transfer and the Online Charging System (OCS) is unaware of any restrictions at the IMS level. The IMS core has no mechanism for preventing or even knowing about this fraudulent use, and only charges the user for a picture exchange.

It will be appreciated that current IMS standards are primarily intended to police traffic based upon bandwidth rather than volume. It will also be appreciated that, whilst a solution to the problem might be to implement volume policing at a Media Resource Function Processor (MRFP), this requires the implementation of a dedicated node through which traffic must pass.

It is also possible to achieve volume policing by configuring the Online Charging System to set limits on the volume of a certain type of traffic in the GGSN, for example data flows marked with a certain rating group received over the Gx interface. The online charging system will in this case only allow a certain amount of data of this type within a PDP context to be reported over the Gy interface before no further credit reservation is granted. Further data transport of this type is then prevented by GGSN. These mechanisms are specified in 3GPP TS23.203, TS29.211, TS29.212, TS29.213, TS29.214, 32.299 and 32.251. A problem with this approach, from an IMS service charging point of view, is that an IMS Application Function is not in control. This results in a number of complications, namely:

When a data flow is stopped the IMS core will not know if this was due to a volume limit being reached or to some other reason, for example a radio bearer failure. The IMS core cannot therefore report the reason to the terminal or to IMS customer care.

The solution is static and cannot take into consideration dynamic values received during session negotiation, for example negotiated file size. This information is not known to the OCS.

The solution depends on bearer charging, which creates a strong dependency between IMS service charging and bearer charging, which is undesirable from a maintenance appoint of view. This is particularly problematic when the IMS and bearer networks are provided by different operators, or by different business units of the same operator, or in roaming scenarios.

The solution cannot take into consideration IMS subscription differentiation. For example, an IMS "Gold" subscriber may be entitled to send larger files than an IMS "Silver" subscriber. This must be controlled by the IMS Application Function, since the bearer layer OCS is only aware of the bearer subscription. There is no simple correlation between an IMS subscription and a bearer subscription.

Bearer charging may not be under direct control of the IMS operator, particularly in the so-called "local breakout" case. The GGSN/PCEF in this case belongs to an operator other than the IMS operator, requiring very complex inter-operator agreements to make the solution feasible.

SUMMARY

It is an object of the present invention to provide a mechanism that allows the IMS the option of restricting user access at the bearer level on the basis of thresholds set by the IMS.

According to a first aspect of the present invention there is provided apparatus configured to implement a Proxy Call Session Control Function for use within an IP Multimedia Subsystem core network. The apparatus comprises a receiver for receiving a session initiation request in respect of an IP Multimedia Subsystem service, and a threshold determiner for determining a threshold applicable to user traffic associated with said service. The apparatus further comprises a sender for sending a session authorisation request to a policy decision function, the request including said threshold and a service data flow identifier identifying the user plane flow for said session.

The threshold determiner may be arranged to determine the threshold as a data volume or time period. It may be configured to determine said threshold based upon the nature of said service, independently of dynamic session data. Alternatively, the threshold determiner may configured to determine said threshold based upon the nature of said service and upon dynamic session data.

The apparatus may comprise a second receiver for receiving from said policy decision function a notification that usage associated with the session has reached said threshold, with the sender being configured to respond to receipt of said notification by sending a request, to the policy decision function, to remove authorisation of the session.

According to a second aspect of the present invention there is provided a method of operating a Proxy Call Session Control Function within an IP Multimedia Subsystem core network. The method comprises receiving a session initiation request in respect of an IP Multimedia Subsystem service, and determining a threshold applicable to user traffic associated with said service. A session authorisation request is then sent to a policy decision function, the request including said threshold and a service data flow identifier identifying the user plane flow for said session.

The threshold may be a data volume or time period, and may be determined based upon the nature of said service, independently of dynamic session data. Alternatively, the threshold may be determined based upon the nature of said service and upon dynamic session data.

The method may comprise receiving from said policy decision function a notification that usage associated with the session has reached said threshold, and responding to receipt of said notification by sending a request, to the policy decision function, to remove authorisation of the session.

According to a third aspect of the present invention there is provided apparatus configured to implement a policy decision function. The apparatus comprises a receiver for receiving from a Proxy Call Session Control Function a session authorisation request in respect of an IP Multimedia Subsystem service, the request including a threshold applicable to user traffic associated with said service and a service data flow identifier identifying the user plane flow for said session. It further comprises an authorisation entity for authorising the request, and a sender for sending said request, once authorised, to a policy enforcing function.

The authorisation entity may be configured to authorise the request by contacting some external database. The apparatus may further comprise a second receiver for receiving from said policy enforcing function a notification that usage associated with the session has reach said threshold, and a second sender for sending said notification to said Proxy Call Session Control Function.

According to a fourth aspect of the present invention there is provided a method of operating a policy decision function. The method comprises receiving from a Proxy Call Session Control Function a session authorisation request in respect of an IP Multimedia Subsystem service, the request including a threshold applicable to user traffic associated with said service and a service data flow identifier identifying the user plane flow for said session. The method further comprises authorising the request, and, once authorised, sending the request to a policy enforcing function.

The step of authorising may comprise contacting some external database or server. The method may further comprise receiving from said policy enforcing function a notification that usage associated with the session has reach said threshold, and sending said notification to said Proxy Call Session Control Function.

According to a fifth aspect of the present invention there is provided a method of policing user level traffic associated with an IP Multimedia Subsystem service. The method may comprise receiving at a Proxy Call Session Control Function a session initiation request in respect of an IP Multimedia Subsystem service and, at the Proxy Call Session Control Function, determining a threshold applicable to user traffic associated with said service. The method further comprises sending a session authorisation request from the Proxy Call Session Control Function to a policy decision function, the request including said threshold and a service data flow identifier identifying the user plane flow for said session. The request is then received and authorised at the policy decision function, and the request sent, if authorised, from the policy decision function to a policy enforcing function. The request is received at the policy enforcing function, the requested session established at the user plane, and the session monitored against said threshold.

According to a sixth aspect of the present invention there is provided apparatus configured to implement a policy decision function. The apparatus comprises a receiver for receiving from a Proxy Call Session Control Function a session authorisation request in respect of an IP Multimedia Subsystem service, the request including a service data flow identifier identifying the user plane flow for said session. The apparatus further comprises an authorisation entity for authorising the request, and a sender for sending said request, once authorised, to a policy enforcing function. The apparatus is configured to include in the request sent to the policy enforcing function a threshold applicable to user traffic associated with said service.

The apparatus may be configured to either relay a received request including said threshold or, where no threshold is included in the received request, to add a threshold to the request before sending it to the policy enforcing function.

According to a seventh aspect of the present invention there is provided apparatus configured to implement a policy enforcing function within a packet network. The apparatus comprises a receiver for receiving a request including a threshold applicable to user traffic associated with said service, and a service data flow identifier identifying a user plane flow for said session, and a packet session controller for establishing the requested session at the user plane. The apparatus further comprises a monitor for monitoring the session against said threshold.

According to an eighth aspect of the present invention there is provided method of policing user level traffic associated with an IP Multimedia Subsystem service. The method comprises receiving at a Proxy Call Session Control Function a session initiation request in respect of an IP Multimedia Subsystem service, and sending a session authorisation request from the Proxy Call Session Control Function to a policy decision function, the request including a service data flow identifier identifying the user plane flow for said session. The method further comprises receiving and authorising said request at the policy decision function, sending said request, if authorised, from the policy decision function to a policy enforcing function, the sent request including a threshold applicable to user traffic associated with said service, receiving said request at the policy enforcing function, establishing the requested session at the user plane, and monitoring the session against said threshold.

DETAILED DESCRIPTION

An approach to the policing of user plane traffic associated with IP Multimedia Subsystem (IMS) service is described here which aims to reuse and enhance existing mechanisms. The user plane may involve fixed and/or mobile (wireless) networks. The approach permits volume policing and a reduced dependency upon bearer charging, without requiring the introduction of an additional media proxy. Several options are described, giving different levels of flexibility and using different components of the existing infrastructure. The option chosen in a particular deployment depends on operator network configuration and wanted functionality. This approach allows the Application Function (AF), which in the IMS case is the Proxy CSCF, to decide upon a threshold which is valid for a particular service data flow within a session. This decision utilises session information and other information (such as configuration data) which the P-CSCF has access to, for example limits based on media type. The session information in turn may be based on decisions taken by other IMS nodes during a session negotiation, for example based on an IMS subscription level of a user.

The threshold determined by the Application Function is communicated to an enforcement point (PEF) which is aware of the user plane on the IP level. The enforcement point then measures the total volume consumed for the service data flow. When the notified threshold is reached, the enforcement point prevents any further traffic for the service data flow and sends a message to the P-CSCF. The P-CSCF can then take appropriate action, for example stopping the session and notifying the end user.

Figure 1:
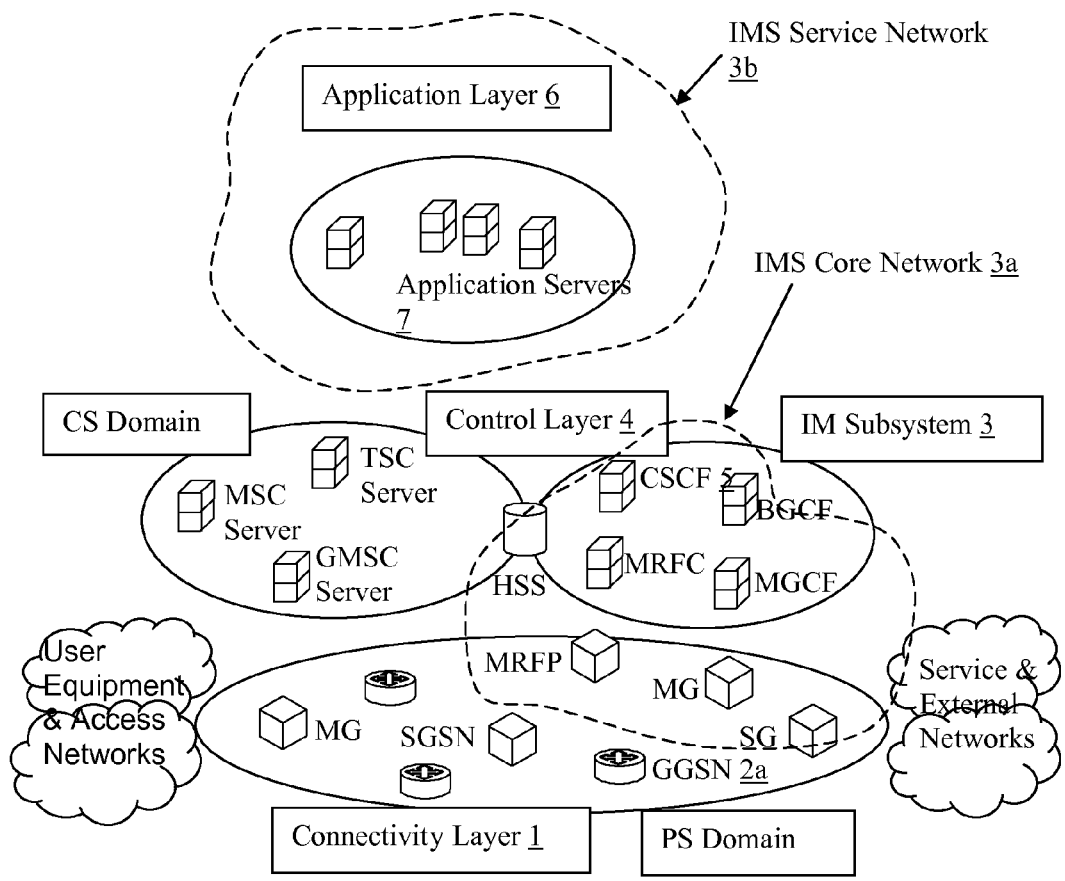
FIG. 1 illustrates schematically a communications system comprising an IMS service architecture integrated with a GPRS packet data access network.
Figure 2:
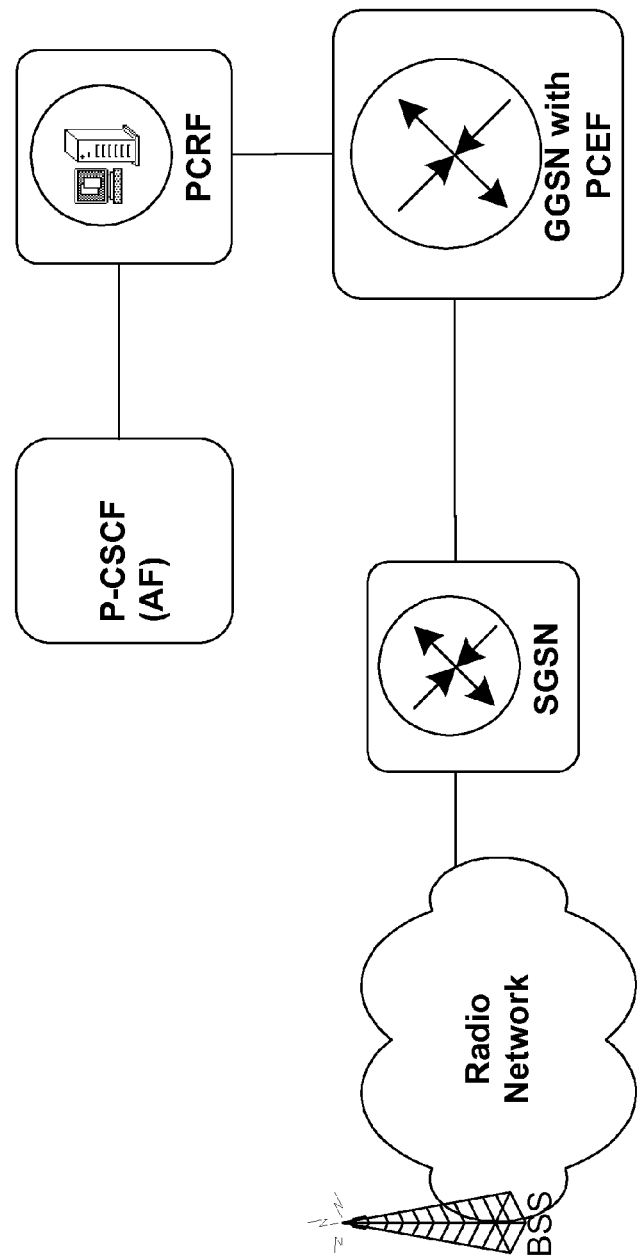
FIG. 2 illustrates schematically a generic PCC architecture within a 3G network, with a combined GGSN/PCEF function.
Figure 3:
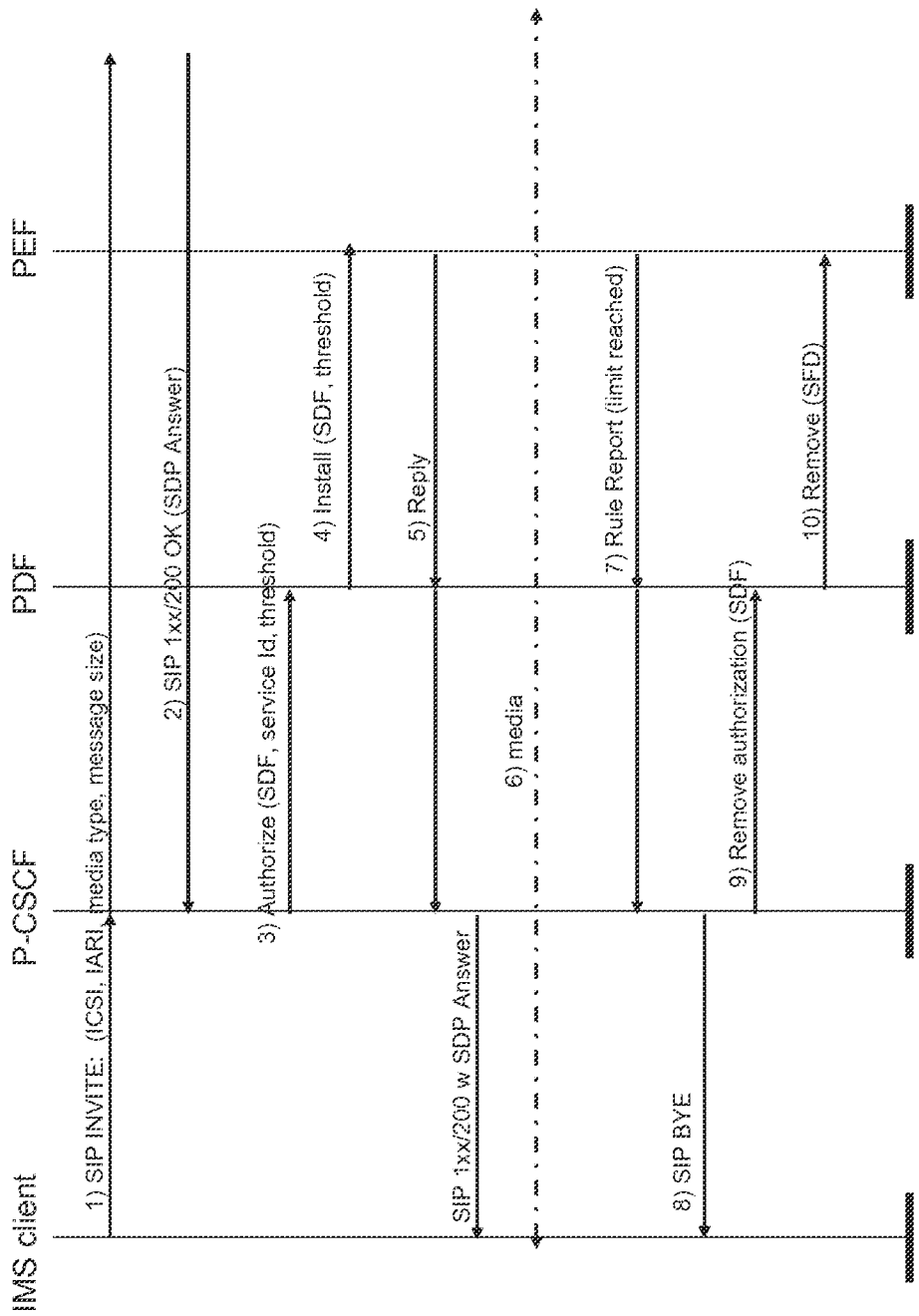
FIG. 3 illustrates a procedure for installing and removing PCC rules in a PEF.
Figure 4:
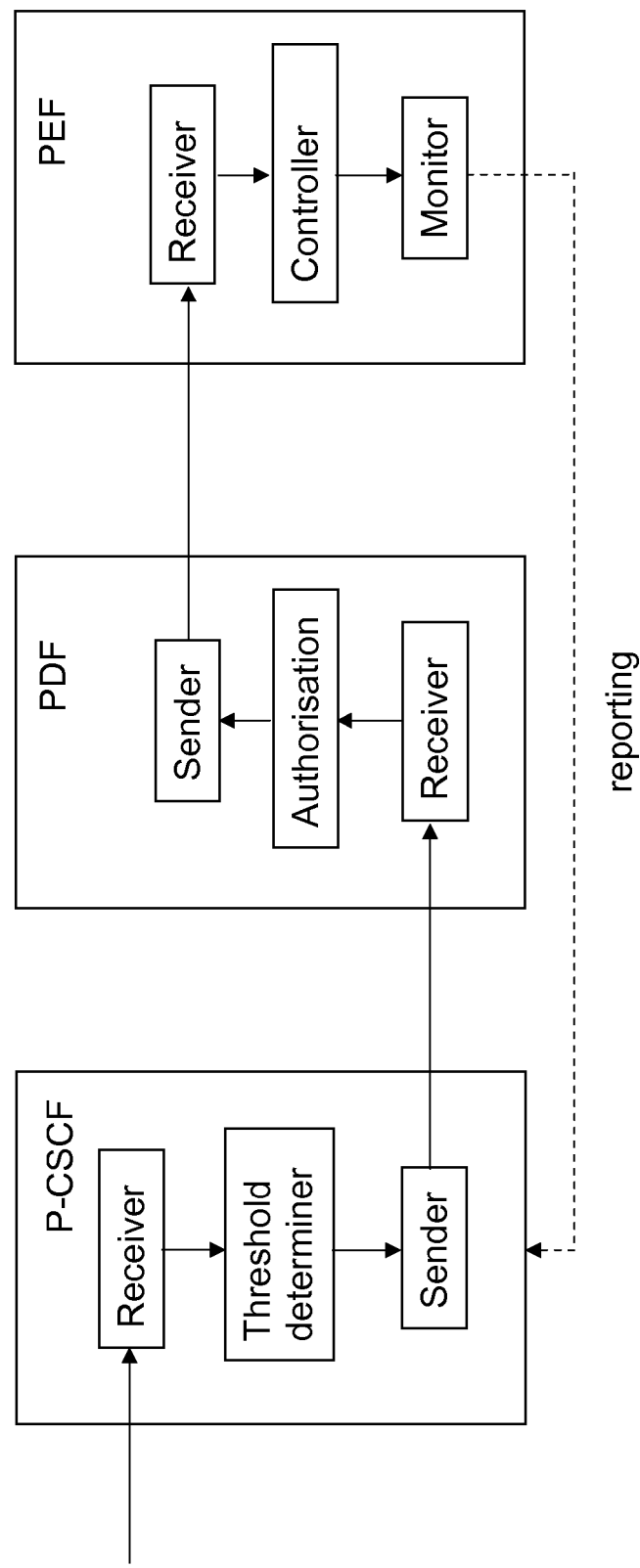
FIG. 4 illustrates schematically various components with a PCC architecture.
Figure 5:
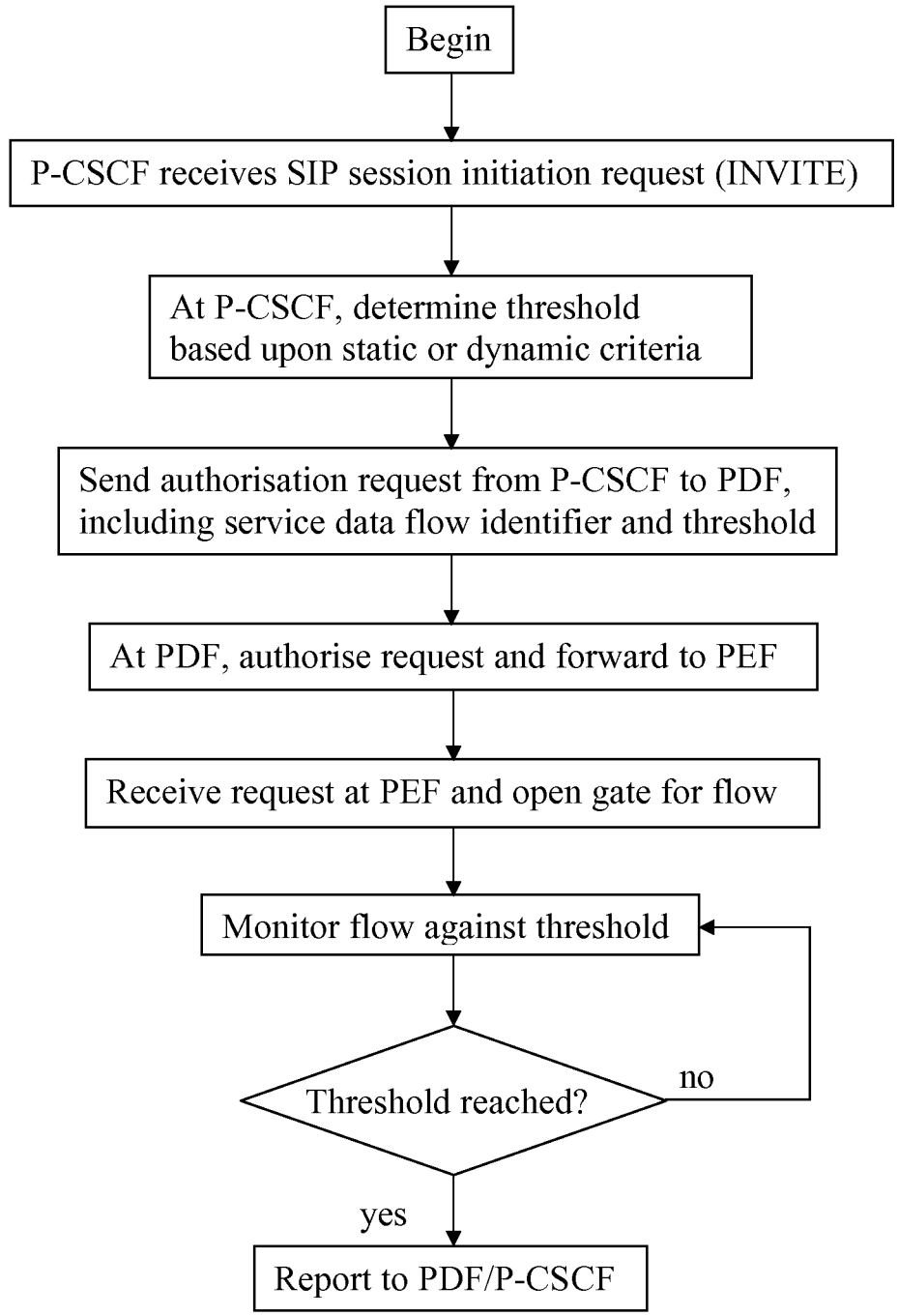
FIG. 5 is a flow diagram showing a procedure for installing a PCC rule in a PEF, where a user threshold is defined at a P-CSCF.

FIG. 3 illustrates a process employing this approach and which is generic in the sense that it covers static as well as dynamic threshold setting. The Policy Decision Function (PDF) is generically described and can refer to an SPDF in the Tispan RACS architecture or PCRF in the 3GPP PCC architecture. The Policy Enforcement Function (PEF) is generically described and can refer to the Tispan BGF in a Session Border Controller (SBC), or PCEF in GGSN. The process illustrates in particular the following steps:

1) A SIP Invite is received by the P-CSCF from an IMS client. The Invite contains information that can be used to identify the requested service, for example an IMS Communication Id (ICSI), IMS Application Reference Id (IARI), or possibly a proprietary feature tag. The Invite also contains SDP information such as media type. It may also contain an explicit indication of an intended file size.
2) An answer is received from the remote end, e.g. a peer IMS client. At this point in time the P-CSCF has knowledge about the outcome of the negotiation between the peers, possibly affected by any intermediate IMS node such as an application server. It is now possible for P-CSCF to create a description of one or more Service Data Flows (SDF), each of which consists of the standard IP 5-tuple (source IP address and port number, destination IP address and port number, protocol in use (e.g. UDP or TCP)). Based on the session description and local configuration, the P-CSCF decides if a volume threshold shall be set on the user plane, and the value of the threshold. These decisions may be made on the basis of the requests service and/or upon user subscription levels.
Example 1: A certain IARI indicates an image sharing service, for which the maximum image size is 1 MB. The threshold is set by the P-CSCF to 1.1 MB to accommodate the transport overhead.
Example 2: No IARI is available, but the media type indicates JPEG, which is considered an image. The threshold is set as above.
Example 3: SIP/SDP indicates a file size of 3 kB. The file size is a result of the negotiation between the peers, possibly limited or inserted based on limits stated in the subscription terms. The threshold is set to 3.2 kB to accommodate the transport overhead.
3) The P-CSCF requests authorization of the SDFs by the PDF. The request includes an SDF identifying the relevant packet flow, the threshold, and other information that the PDF needs to take decisions on, for example, quality of service and bearer charging. The threshold may be included in the Media-Sub-Component AVP (3GPP TS 29.214).
4) The PDF takes a decision to authorise the request or not, for example based upon available resources. Where the P-CSCF does not provide a threshold, because for example it does not support dynamic threshold setting, the PDF may use information received in the authorization request to derive a statically defined threshold, for example based on the IARI.
The PDF takes other policy decisions and installs the complete rule in the PEF. The PDF may add further information/instructions to the rule.
5) A reply is sent by the PEF to the PDF to acknowledge the authorization and installation of the rule(s), and the opening of a "gate" or "gates" on the user plane. This is forwarded by the PDF to the P-CSCF
6) Media is allowed to flow in respect of the request.
7) The PEF counts the bytes associated with the allowed service and accumulates a counter. When it discovers that the threshold limit is reached, it stops any further communication for the SDF by closing the gate and discarding and subsequently received data packets.
The PEF reports to the PDF that the threshold is exceeded. The PDF forwards the report to the P-CSCF.
8) The P-CSCF receives the report and decides on the proper action. This could be to do nothing and let any additional SDFs for this (SIP) session continue. If it was the last SDF in the session, the decision could be to terminate the session, possibly with a result code indicating "Allowed message size exceeded". The P-CSCF may also generate a charging record with the same indication, in order for the IMS operator to discover fraud attempts, or even issue an alarm.
9) When the session is terminated the P-CSCF sends a request to remove the authorization to the PDF.
10) The PDF requests the PEF to remove the SDFs for the session. If this was the last SDF for the connection, the connection may be terminated.

Compared to the provision of services over the unmanaged Internet, the IMS offers increased operator control since signalling protocols between the peers are always terminated inside the network, under operator control. The operator can charge based on service usage rather than transport. IMS signalling-based charging supports value based charging and can therefore protect revenue levels. The approach described here supports IMS signalling based charging with a level of control over the user plane sufficient to prevent or minimise fraud. The approach reuses as far as possible existing standardized components, without creating undesirable dependencies upon bearer charging and without forcing the introduction of an additional media proxy.

From an end user's point of view, IMS signalling based charging is simple and easy to understand. The end user can easily predict what a service will cost, which gives confidence and increases the likelihood that the service is used. Compared to access/transport based charging, IMS signalling based charging relates to the service as experienced by the end user. For example both end points are identified by user (friendly) identities rather than IP address, the SIP session is described rather than the network connection, and the same charging model is used regardless of access type. The approach reduces the risks to operators when introducing such attractive charging models.

It will be appreciated by the person of skill in the art that various modifications may be made to the above described embodiments without departing from the scope of the present invention.

For example, the threshold that is applicable to user traffic associated with said service, and which is determined by the P-CSCF, may represent a time rather than a volume. Consider an operator that offers as a service the sending of user generated media (for example a piece of film) for a maximum time for a fixed price, regardless of volume (film could be compressed for example). The P-CSCF could in principle set a time threshold itself, or an OCS could grant a limited time quota for a particular service/media type/subscriber. However, neither the P-CSCF nor the S-CSCF/AS (the enforcement point measuring a received quota if online charging is used) is fully aware if media is paused. This is not necessarily clearly advertised in SIP signalling. Setting the time threshold on the media plane (using Rx/Gx) solves this, since PCEF can measure active time, ie the time media actually flows, and handle potential pausing.

The invention claimed is:

1. An apparatus configured to implement a proxy call session control function for use within an Internet Protocol (IP) multimedia subsystem core network, the apparatus comprising:
a receiver configured to receive a session initiation request in respect of an IP multimedia subsystem service;
a threshold determiner configured to determine a maximum data volume or maximum time period threshold applicable to user traffic associated with said service;
a sender configured to send a session authorization request to a policy decision function, the request including said threshold and a service data flow identifier identifying the user plane flow for said session; and a second receiver configured to receive from said policy decision function a notification that usage associated with the session has reached said threshold.

2. The apparatus according to claim 1, wherein said threshold determiner is further configured to determine said threshold based upon the nature of said service, independently of dynamic session data.

3. The apparatus according to claim 1, wherein said threshold determiner is further configured to determine said threshold based upon the nature of said service and upon dynamic session data.

4. The apparatus according to claim 1, wherein said sender is further configured to respond to receipt of said notification by sending a request, to the policy decision function, to remove authorization of the session.

5. A method of operating a proxy call session control function within an Internet Protocol (IP) multimedia subsystem core network, the method comprising:
receiving a session initiation request in respect of an IP multimedia subsystem service;
determining a maximum data volume or maximum time period threshold applicable to user traffic associated with said service;
sending a session authorization request to a policy decision function, the request including said threshold and a service data flow identifier identifying the user plane flow for said session;
receiving from said policy decision function a notification that usage associated with the session has reached said threshold; and
responding to receipt of said notification by sending a request, to the policy decision function, to remove authorization of the session.

6. The method according to claim 5, further comprising determining said threshold based upon the nature of said service, independently of dynamic session data.

7. The method according to claim 5, further comprising determining said threshold based upon the nature of said service and upon dynamic session data.

8. An apparatus configured to implement a policy decision function, comprising:
a receiver configured to receive from a proxy call session control function a session authorization request in respect of an IP multimedia subsystem service, the request including a maximum data volume or maximum time period threshold applicable to user traffic associated with said service and a service data flow identifier identifying the user plane flow for said session;
an authorization entity configured to authorize the request;
a sender configured to send the request, once authorized, to a policy enforcing function; and
a second receiver configured to receive from said policy enforcing function a notification that usage associated with the session has reach said threshold.

9. The apparatus according to claim 8, wherein said authorization entity is further configured to authorize the request by contacting a subscriber profile repository.

10. The apparatus according to claim 8, further comprising a second sender configured to send said notification to said proxy call session control function.

11. A method of operating a policy decision function, comprising:
receiving from a proxy call session control function a session authorization request in respect of an IP multimedia subsystem service, the request including a maximum data volume or maximum time period threshold applicable to user traffic associated with said service and a service data flow identifier identifying the user plane flow for said session;
authorizing the request;
once authorized, sending the request to a policy enforcing function; and
sending said notification to said proxy call session control function.

12. The method according to claim 11, wherein said step of authorizing comprises contacting a subscriber profile repository.

13. The method according to claim 11, further comprising receiving from said policy enforcing function a notification that usage associated with the session has reach said threshold.

14. A method of policing user level traffic associated with an IP multimedia subsystem service, the method comprising:
receiving at a proxy call session control function a session initiation request in respect of an IP multimedia subsystem service;
at the proxy call session control function, determining a maximum data volume or maximum time period threshold applicable to user traffic associated with said service;
sending a session authorization request from the proxy call session control function to a policy decision function, the request including said threshold and a service data flow identifier identifying the user plane flow for said session;
receiving and authorizing said request at the policy decision function;
sending said request, if authorized, from the policy decision function to a policy enforcing function;
receiving said request at the policy enforcing function, establishing the requested session at the user plane, and monitoring the session against said threshold;
receiving from said policy decision function a notification that usage associated with the session has reached said threshold; and
responding to receipt of said notification by sending a request, to the policy decision function, to remove authorization of the session.

15. An apparatus configured to implement a policy decision function, comprising:
a receiver configured to receive from a proxy call session control function a session authorization request in respect of an IP multimedia subsystem service, the request including a service data flow identifier identifying the user plane flow for said session;
an authorization entity configured to authorize the request;
a sender configured to send said request, once authorized, to a policy enforcing function, wherein the apparatus is configured to include in the request sent to the policy enforcing function a maximum data volume or maximum time period threshold applicable to user traffic associated with said service; and
wherein the apparatus is configured to either relay a received request including said threshold or, where no threshold is included in the received request, to add a threshold to the request before sending it to the policy enforcing function.

16. An apparatus configured to implement a policy enforcing function within a packet network, the apparatus comprising:
a receiver configured to receive a request including a maximum data volume or maximum time period threshold applicable to user traffic associated with a service, and a service data flow identifier identifying a user plane flow for a session;

a packet session controller for establishing the requested session at the user plane;

a monitor configured to monitor the session against said threshold; and a second receiver configured to receive a notification that usage associated with the session has reached said threshold.

17. A method of policing user level traffic associated with an IP multimedia subsystem service, the method comprising:

receiving at a proxy call session control function a session initiation request in respect of an IP multimedia subsystem service;

sending a session authorization request from the Proxy call session control function to a policy decision function, the request including a service data flow identifier identifying the user plane flow for said session;

receiving and authorizing said request at the policy decision function;

sending said request, if authorized, from the policy decision function to a policy enforcing function, the sent request including a maximum data volume or maximum time period threshold applicable to user traffic associated with said service;

receiving said request at the policy enforcing function, establishing the requested session at the user plane, and monitoring the session against said threshold;

receiving from said policy decision function a notification that usage associated with the session has reached said threshold; and responding to receipt of said notification by sending a request, to the policy decision function, to remove authorization of the session.

18. An apparatus configured to implement a proxy call session control function for use within an Internet Protocol (IP) multimedia subsystem core network, the apparatus comprising:

a receiver configured to receive a session initiation request in respect of an IP multimedia subsystem service;

a threshold determiner configured to determine a maximum time period threshold applicable to user traffic associated with said service; and a sender configured to send a session authorization request to a policy decision function, the request including said threshold and a service data flow identifier identifying the user plane flow for said session.

19. A method of operating a proxy call session control function within an Internet Protocol (IP) multimedia subsystem core network, the method comprising:

receiving a session initiation request in respect of an IP multimedia subsystem service;

determining a maximum time period threshold applicable to user traffic associated with said service; and sending a session authorization request to a policy decision function, the request including said threshold and a service data flow identifier identifying the user plane flow for said session.

20. An apparatus configured to implement a policy decision function, comprising:

a receiver configured to receive from a proxy call session control function a session authorization request in respect of an IP multimedia subsystem service, the request including a maximum time period threshold applicable to user traffic associated with said service and a service data flow identifier identifying the user plane flow for said session;

an authorization entity configured to authorize the request; and a sender configured to send the request, once authorized, to a policy enforcing function.

21. A method of operating a policy decision function, comprising:

receiving from a proxy call session control function a session authorization request in respect of an IP multimedia subsystem service, the request including a maximum time period threshold applicable to user traffic associated with said service and a service data flow identifier identifying the user plane flow for said session;

authorizing the request; and once authorized, sending the request to a policy enforcing function.

22. A method of policing user level traffic associated with an IP multimedia subsystem service, the method comprising:

receiving at a proxy call session control function a session initiation request in respect of an IP multimedia subsystem service;

at the proxy call session control function, determining a maximum time period threshold applicable to user traffic associated with said service;

sending a session authorization request from the proxy call session control function to a policy decision function, the request including said threshold and a service data flow identifier identifying the user plane flow for said session;

receiving and authorizing said request at the policy decision function;

sending said request, if authorized, from the policy decision function to a policy enforcing function;

receiving said request at the policy enforcing function, establishing the requested session at the user plane, and monitoring the session against said threshold.

23. An apparatus configured to implement a policy decision function, comprising:

a receiver configured to receive from a proxy call session control function a session authorization request in respect of an IP multimedia subsystem service, the request including a service data flow identifier identifying the user plane flow for said session;

an authorization entity configured to authorize the request; and a sender configured to send said request, once authorized, to a policy enforcing function, wherein the apparatus is configured to include in the request sent to the policy enforcing function a maximum time period threshold applicable to user traffic associated with said service.

24. An apparatus configured to implement a policy enforcing function within a packet network, the apparatus comprising:

a receiver configured to receive a request including a maximum time period threshold applicable to user traffic associated with a service, and a service data flow identifier identifying a user plane flow for a session;

a packet session controller for establishing the requested session at the user plane; and a monitor configured to monitor the session against said threshold.

25. A method of policing user level traffic associated with an IP multimedia subsystem service, the method comprising:

receiving at a proxy call session control function a session initiation request in respect of an IP multimedia subsystem service;
sending a session authorization request from the Proxy call session control function to a policy decision function, the request including a service data flow identifier identifying the user plane flow for said session;
receiving and authorizing said request at the policy decision function;
sending said request, if authorized, from the policy decision function to a policy enforcing function, the sent request including a maximum time period threshold applicable to user traffic associated with said service; and
receiving said request at the policy enforcing function, establishing the requested session at the user plane, and monitoring the session against said threshold.

* * * * *